United States Patent [19]

Pinsolle

[11] Patent Number: 4,753,766

[45] Date of Patent: Jun. 28, 1988

[54] PROCESS FOR FABRICATING A MULTICOLORED SHEET

[75] Inventor: Francis Pinsolle, Villefranche Sur Mer, France

[73] Assignee: S.A.M. Siamp-Cedap, Monaco

[21] Appl. No.: 806,281

[22] Filed: Dec. 6, 1985

Related U.S. Application Data

[63] Continuation-in-part of Ser. No. 657,416, Oct. 3, 1984, abandoned.

[30] Foreign Application Priority Data

Oct. 18, 1985 [FR] France .................................. 85 15621

[51] Int. Cl.⁴ ............................................. B29C 47/04
[52] U.S. Cl. .................................... 264/171; 264/245; 425/131.1; 425/462
[58] Field of Search .............................. 264/171, 245; 425/131.1, 462

[56] References Cited

U.S. PATENT DOCUMENTS

| | | | |
|---|---|---|---|
| 3,444,031 | 5/1969 | Schrenk | 264/1.6 |
| 3,471,898 | 10/1969 | Krystof | 425/131.1 |
| 3,909,170 | 9/1975 | Riboulet et al. | 425/133.5 |
| 4,476,075 | 10/1984 | Brinkmann et al. | 264/171 |
| 4,562,023 | 12/1985 | Pabst et al. | 264/171 |

FOREIGN PATENT DOCUMENTS

| | | | |
|---|---|---|---|
| 3229554 | 3/1984 | Fed. Rep. of Germany | 264/171 |
| 2437289 | 5/1980 | France | 425/133.5 |
| 55-117639 | 9/1980 | Japan | 425/133.5 |

*Primary Examiner*—Jeffery Thurlow
*Attorney, Agent, or Firm*—Erwin S. Teltscher

[57] ABSTRACT

Process designed to obtain a sheet of thermoplastic material containing at least on one side a decoration consisting of parallel stripes of different colors juxtaposed to each other and capable of being thermoformed to produce hollow volumes containing the same initial decoration, characterized in that it consists in extruding simultaneously, through a single multiple duct die, firstly a monochrome basic layer, secondly at least one intermediate decoration layer, formed of longitudinal, juxtaposed stripes of different colors, and lastly at least one upper transparent layer overlapping said intermediate layer, all said layers being combined in a die area as close as possible to its outlet.

10 Claims, 4 Drawing Sheets

PROCESS FOR FABRICATING A MULTICOLORED SHEET

This application is a continuation-in-part application of application Ser. No. 657,416 filed 10/3/84, (now abandoned), which in turn is based on French application No. 83.16045, filed on 10/03/84 the priority of which is claimed under 35 U.S.C. 119.

This invention relates to a process designed to obtain a leaf or sheet of thermoplastic material having at least on one side a decoration consisting of parallel stripes of different colors juxtaposed exactly one beside the other and capable of being thermoformed to produce hollow volumes containing the same initial decoration.

As a new industrial product it also covers any sheet of thermoplastic material decorated on at least one side with parallel stripes of different colors strictly contiguous and obtained by this process.

It also covers application of these sheets in a thermoforming process, in itself known, in view of obtaining volumes with the same decoration as said sheets and designed particularly for the packing of food products.

Finally it covers the volumes, receptacles and similar, designed particularly for the food industry, and produced by thermoforming colored sheets of said type.

Such leaves or sheets have multiple applications, especially in the packing industry, because they are suitable, particularly, for producing receptacle boxes or holders through thermoforming, these boxes can each have multicolor patterns or have different colors from one box to another in the same set of boxes.

To obtain an effect of this type, particularly in such special applications, it has been proposed to use either sheets of plastic on which stripes of different colors were printed side by side, or sheets of plastic on which stripes of different colors were bonded. In both cases the resultant leaves or sheets were very costly, and their quality was not sufficient to enable them to support the thermoforming operations with satisfactory results.

In fact, in the case of printing colors directly on the sheet, the elongation or drawing resulting from the thermoforming reveals nonprinted areas, in the form of lines with the color of the original sheet, whereas bonded stripes not only have the same draw-back, but also tend to unstick on the sides, particlarly when their edges lie on the edge area of the receptacles formed.

The solution to this problem could therefore only lie in a process in which the material forming the sheet is continuous and homogeneous, whilst having a different color from one stripe to another. Such a process should therefore include an extrusion step of a single material or similar and compatible materials from different sources, either owing to the color, or to their nature, through as many reservoirs as there are sources and on output from which the material is unified before solidification.

Unfortunately attempts to practice this process have always failed, owing to a pre-solidification creep phenomenon, producing local uncontrollable migrations of a material in the adjacent materials, particularly of a color in the adjacent colors, making the boundary between two stripes blurred instead of being clean and straight.

The invention therefore lay in the discovery of the critical conditions avoiding this creep and without which a satisfactory result cannot be obtained, even with theoretically suitable equipment, such as that described by the Applicant in his French patents, particularly Pat. No. 83.16045.

To obtain the result required, i.e., leaf or sheet of plastic with at least on one side a series of strictly contiguous stripes of different colors, the process according to the invention consists, in its principle, in extruding simultaneously, through a single multipleduct die, in itself known, on the one hand a monochrome basic layer, on the other hand at least one intermediate decorative layer formed of longitudinal, juxtaposed stripes of different colors of materials, and finally at least one upper transparent layer covering said intermediate layer, all said layers being combined in said die in areas as close as possible to its outlet.

Although it is understood that the invention covers the production of such juxtaposed stripes, both of different colors and different materials, although adjacent and compatible, for greater convenience, please refer in the description of this process to the case of stripes of different colors.

The satisfactory practice of this process implies a certain number of additional features:

In the first place, to avoid the creep phenomenon between the material of adjacent stripes, it is necessary that the pressure of the material at the point at which the stripes join together be as low as possible. For this purpose it is provided, according to the invention, that stripes of different colors forming the intermediate layer are kept separated from each other sufficiently downline from a feed volume forming a buffer reservoir, thus providing "damping" or "relaxing" of the extrusion pressure.

In the second place, the material of the basic layer and the stripes forming the intermediate layer and upper layer being the same, the physical condition of this material in said layers, i.e., its fluidity, temperature, pressure and the turbulence phenomena which arise, etc ..., should be such that said layers weld together, side by side, i.e., simply by contact, without any separation or migration of material from one stripe to another.

Naturally said considerations involved with the physical condition of the plastic material used will vary from one material to another. Nevertheless in very frequent case of polystyrene, the comparative example below will indicate the practical ranges of the magnitude involved, which therefore enter into the scope of the invention.

In the third place, the process comprises preferably a sequential process according to which the stripes forming the intermediate layer are firstly connected together, then after a minimum distance required for them to weld together satisfactorily, they are connected to the upper transparent layer, the whole being then finally connected to the basic layer, without there being any migration of material from any layer to another layer, especially naturally at the separation between the stripes.

BRIEF DESCRIPTION OF THE DRAWING

FIG. 5 is a large-scale fragmentary diagram illustrating critical distances between connection points of the stripes and of the layers.

Figure 1:
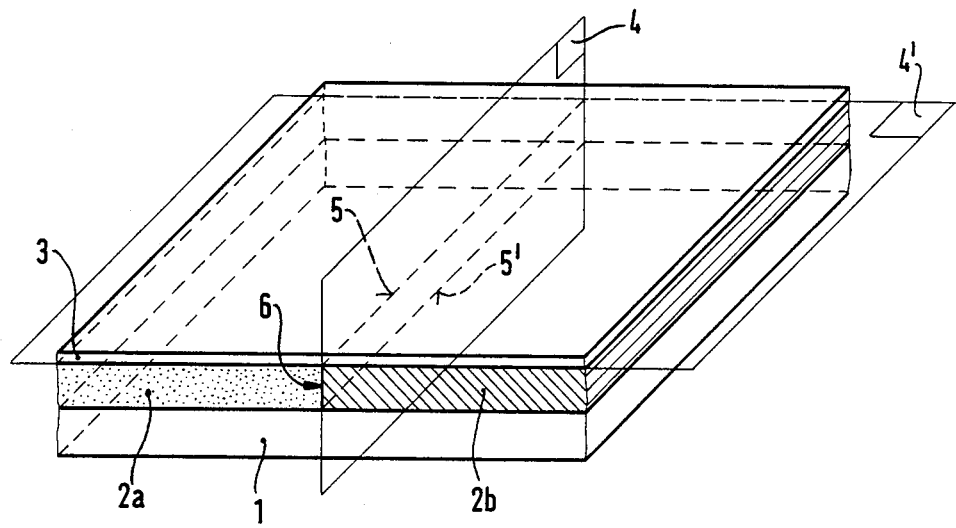
FIG. 1 is a perspective view of the present invention wherein an ideal junction area between the srtipes is indicated in the form of a plane.

More generally speaking and systematically, the process according to the invention implies respect of two numerical dimensional conditions:

the distance L between the meeting point between the stripes and their meeting points with the upper transparent layer is a minimum of around·15 to 40 times the thickness of said stripes, preferably 20 to 30 times;

the same distance L should not be lower than a value of around 5 to 10 times the thickness of said stripes, a minimum value necessary for them to weld together; if this condition is not observed, there may be a risk of migration of the material from the upper transparent layer to the central decorative layer, at the separation between the stripes, precisely at the point where the stripes may be imperfectly welded toeether;

the distance L' between the meeting point of the stripes in the upper layer and the meeting point between the whole and the basic layer is also a maximum of 15 to 40 times the thickness of the two above layers together, and preferably 20 to 30 times.

In fact the combination of the above condition results in that the difference in fluidity between two juxtaposed stripes is such that over said distance L, the migration phenomena from the material of one stripe to an adjacent stripe are negligible.

Here it should be repeated that, whatever the extrusion dies which may have been developed previously, and particularly the one described in the Applicant's French Pat. No. 83.16045, no satisfatory result can be obtained if the conditions defined in this process are not satisfied.

These conditions can be complemented by specifying that, for the best possible results, the pressure gradient for the material on outlet from said feed volumes is as low as possible for each of the stripes.

The practice of the process according to the invention can involve a number of modifications.

According to a first modification, the thickness of the stripes of different colors is the same and the surface of the intermediate layer is continuous and smooth. This is the simplest and most general case. In this way sheets are obtained which, through thermoforming, produce volumes also with a smooth surface, suitable to very widely consumed products for example yogurt pots, packings for fresh cheeses, dairy products, jam and similar.

According to a second modification, the color stripes are of different thicknesses, the stripes being at a different levels in the basic layer or the upper transparent layer.

The resultant sheet can thus contain more or less thick areas corresponding to different colors. Through thermoforming, volumes can thus be obtained containing strengthened walls, or volumes with relief patterns such as ribs on certain sides, contributing to their aesthetic appearance.

Likewise, the relative width between adjacent stripes of constant thickness can be adjusted by modifying the flow rate of the material in the reservoirs of respective stripes. The resultant sheets can then be worked by obtaining, on the thermoformed volumes, aesthetic effects corresponding to the respective width of the stripes.

As indicated above, the plastic material used in this process is generally polystyrene whose characteristics and especially the grade, can vary from one stripe to another on the intermediate layer, and also from one layer to another, but generally speaking, with the material:

the thickness of the layers is a few tenths of mm;

the width of the stripes is variable between 20 to 300 mm;

the distances L and L' are around 20 to 50 mm.

The following comparative exxample clearly indicates the critical character of the conditions defining the process to obtain a satisfactory result, i.e., a sheet whose respective colors in the stripes do not migrate from one to another:

EXAMPLE

Figure 4:
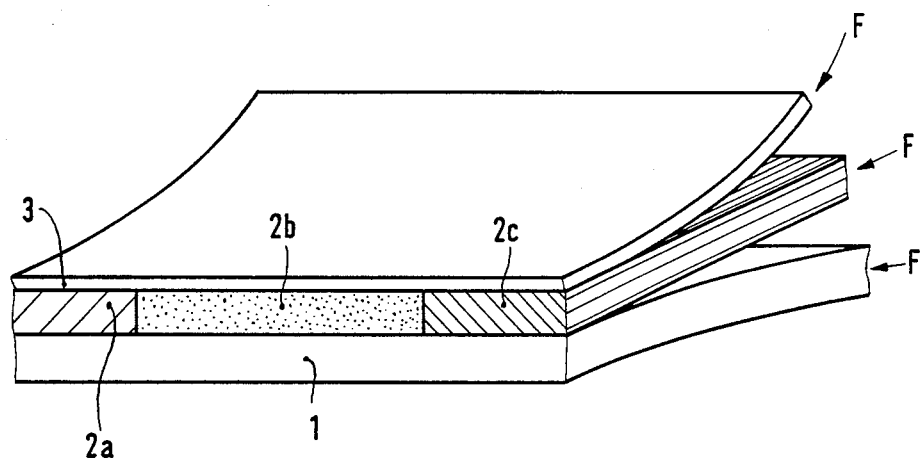
FIG. 4 is a perspective view of the present invention indicating the combination of the basic, intermediate and upper layers with each other

By means of a multiple-duct die F, having with the characteristics described in the French Pat. No. 83.16045, the following are extruded simultaneously:

a white basic layer of polystyrene, 450 mm wide, 0.4 mm thick, designated by 1 on FIG. 4 in the attached drawing;

three juxtaposed stripes, of the same polystyrene, alternatively white and pink, 150 mm wide each, 0.5 mm thick, designated by 2a, 2b, 2c;

an upper layer of transparent polystyrene, 450 mm wide, 0.1 mm thick, designated by 3.

The extrusion temperature (die temperature) is 200° to 220° C.

A die has been built by which three tests can be made successively, corresponding to the values of said values of L and L':

|  | L (mm) | L' (mm) | Figure in the drawing |
| --- | --- | --- | --- |
| Test 1 | 31 | 33 | 1 |
| Test 2 | 80 | 80 | 2 |
| Test 3 | 3 | 33 | 3 |

For each test a homogeneous composite sheet is obtained, satisfactory from the point of view of its mechanical performance, but of considerably different appearance, as illustrated by the corresponding figures in the drawing which show schematically, cross-sectionnally and in perspective, the junction area between two stripes such as 2a and 2b.

Figure 3:
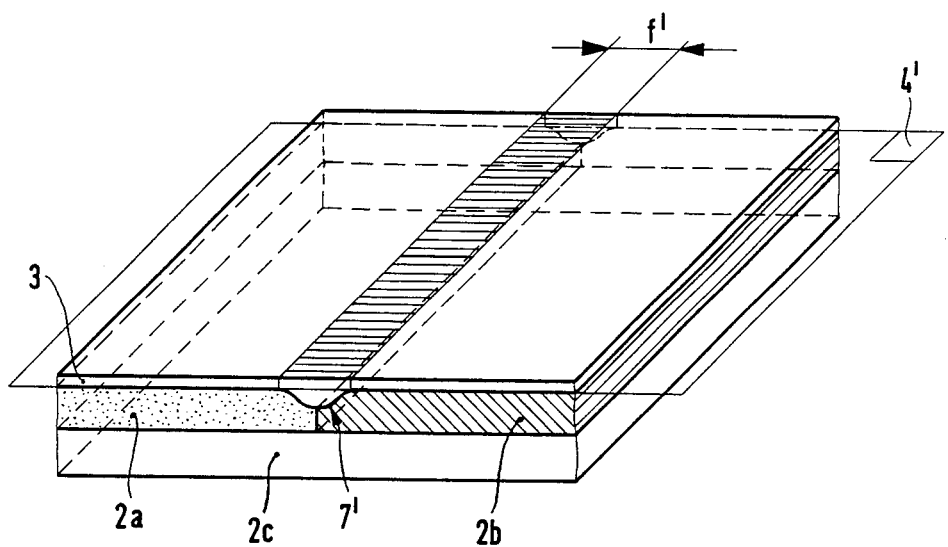
FIG. 3 is a perspective view of the present invention wherein the critical cross-sectional distancce L is too short.

FIG. 1 illustrates the process according to the invention. In this figure 3 shows the upper transparent layer, 2a and 2b the central decorative layer containing stripes 2a and 2b, and 1 the lower layer. The ideal junction area has been indicated in it, located in the vertical plane 4 shown on the top of the stripes along a junction line 5 (or 5'), straight and regular, and on the transverse section along a straight vertical segment 6.

Figure 2:
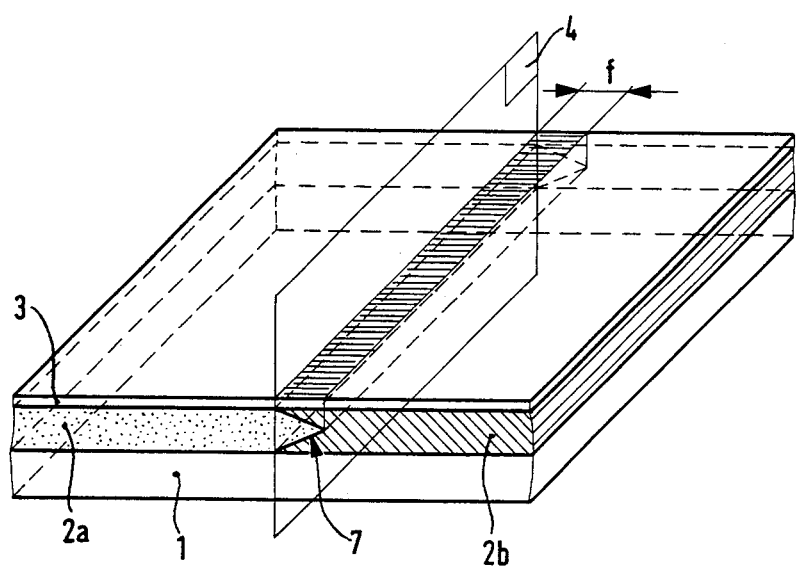
FIG. 2 is a perspective view of the present invention wherein a critical cross-sectional distance L is too great and a junction area is no longer represented by a plane as is the case in FIG. 1.

FIG. 2 illustrates the case in which the distance L is too great. It can be seen here that the junction area is no longer materialized by a plane 4 as in the ideal case in FIG. 1 ; the material in the stripe 2a tends to creep beyond this plane 4 and migrate into stripe 2b; the junction line is materialized by the curve 7. This results, on the upper side, in a blurred area F not at all like the clean line 5 in the ideal case in FIG. 1.

The more L is away from the maximum ideal value (in fact the longer the time spent in the die), the more the area f is large, i.e., the more the junction is blurred. It may also be considered that if one of the stripes 2a or 2b is made of a transparent material, internal creep alone, i.e., within the thickness of the stripe, would cause the same drawback.

FIG. 3 illustrates now the case in which the distance L being too short, the materials in stripes 2a and 2b have not had the time to weld together satisfactorily before being connected to the upper transparent layer. This results, at the separation between the stripes, in migration of the material from the other transparent layer 3 beyond the ideal horizontal plane 4'. An area f' appears on the upper surface, which without being blurred as in the case in FIG. 2, nonetheless has a bad effect on the quality and appearance of the sheet.

Naturally FIGS. 1, 2, 3 are sketched at a very large scale, only showing small portion of stripes, to facilitate the understanding of the invention and its importance.

As indicated in the preamble of this description, this invention not only covers said process but also the new industrial products, such as leaves, sheets or similar in thermoplastic material, with at least on one of their sides a decoration consisting of parallel stripes of different colors, strictly contiguous, i.e., with no gap between two stripes and no migration of the color from one stripe to the next one, these products being obtained by using the process described above, and also all the applications of these products.

Amongst these applications, the invention therefore also covers the thermoforming of these leaves or sheets in view of producing volumes, i.e., receptacles or packs, individual or collective, designed particularly for the food industry, these volumes having a decoration similar to the initial decoration of said sheets.

Series of receptacles can thus be produced with colors differing from one receptacle to another or from one series to another, or still again, according to the width of the colored stripes in the original sheet, receptacles each decorated individually by stripes of different colors, thus differentiating the products or qualities, or characterizing a producer.

In respect to new industrial products, the invention also covers individual colored and/or decorated receptacles and their series, as has just been described.

I claim:

1. In a process to produce a sheet with the aid of a multiple-duct die, and wherein said sheet includes a plurality of stripes of thermoplastic material of different respective colors, said stripes adjoining each other and being capable of being thermoformed to produce hollow volumes with the same initial decoration, with a view of avoiding creep between materials of adjacent stripes, and wherein each stripe has a predetermined thickness, comprising the steps of:
    forming said stripes of different respective colors, so as to be disposed parallel to one another;
    connecting said stripes to one another to form an intermediate layer,
    forming an outer transparent layer;
    connecting said intermediate layer to said outer transparent layer so as to cover said intermediate layer,
    forming a monochrome basic layer;
    combining the intermediate layer and the transparent layer with said basic layer so that the intermediate layer is disposed beteen the transparent layer and the monochrome basic layer, each layer having a respective prearranged thickness,
    extruding said material of different respective colors simultaneously through said multiple-duct die along a predetermined direction so that said material of different respective colors is in areas as close as possible to respective outlets of said multiple-duct die,
    selecting a first critical distance L, defined as a distance in an axial directon between one meeting point between the stripes and another meeting point of the stripes with the outer transparent layer, to have substantially a length of a maximum of 15–40 times the thickness of one of said stripes,
    selecting a second critical distance L', defined as a distance along a partly axial direction between said other meeting point of the stripes and the outer layer, and still another meeting point of the combined stripes and the outer layer with said basic layer, to have substantially a length of a maximum of 15–40 times the thickness of the combined outer and basic layers,
    whereby there is at most negligible migration of color from one stripe to an adjoining stripe especially at a separation between the stripes.

2. Process according to claim 1, characterized in that the stripes of different colors forming the intermediate layer are kept separated from each other sufficiently downstream from a feed volume foming a buffer reservoir in order for the pressure of the material at the point of meeting between the stripes to be as low as possible.

3. Process according to claim 1, characterized in that the material of the basic layer and stripes forming the intermediate layer and the outer layer is the same, and the physical condition of this material and said layers, i.e., its fluidity, temperature, pressure and turbulence phenomena which arise in it, is such that said layers weld together side by side, i.e., simply by contact without separation or migration of materials from one stripe to another.

4. Process according to claim 1, characterized in that to difference in fluidity between two juxtaposed stripes is such that, over said distance L, the migration phenomena of material from one stripe to an adjacent stripe are negligible.

5. Process according to claim 2, characterized in that a pressure gradient of material from an outlet from said feed volumes is as low as possible for each of the layers.

6. Process acccording to claim 1, characterized in that the thickness of the stripes of different colors is the same and the surface of the intermediate layer is continuous and smooth.

7. Process according to claim 1, characterized in that the colored stripes are of different thicknesses, the stripes being of different levels in the basic layer or in the outer transparent layer.

8. Process according to claim 1, characterized in that the relative width between adjacent strips of constant thickness be adjusted by modifying the flow rate of the material in the reservoirs of the respective strips.

9. Process according to claim 1, characterized in that:
    the material is polystyrene whose characteristics, and especially the grade, can vary from one stripe to another for the intermediate layer, and also from one layer to another;
    the thickness of the layers is a few tenths of mm;
    the width of the stripes is variable between 20 and 300 mm;
    the distances L and L' are around 20 to 50 mm.

10. The process according to claim 1, wherein said first critical distance L is 20–30 times the thickness of said stripes, and wherein said second critical distance L' is 20–30 times the thickness of the combined outer and basic layers.

* * * * *